United States Patent

Asanuma

[11] Patent Number: 5,932,933
[45] Date of Patent: Aug. 3, 1999

[54] STRUCTURE OF POWER SUPPLY SYSTEM

[75] Inventor: Satoru Asanuma, Yokohama, Japan

[73] Assignee: Matsushita Electric Industrial Co., Ltd., Osaka, Japan

[21] Appl. No.: 09/066,782

[22] Filed: Apr. 27, 1998

[30] Foreign Application Priority Data

May 7, 1997 [JP] Japan .................................... 9-132921

[51] Int. Cl.⁶ .................................................. H02B 1/24
[52] U.S. Cl. .............................. 307/18; 307/38; 307/147; 361/601; 361/622; 361/641
[58] Field of Search ............................... 307/18, 147, 38; 361/601, 641, 828, 622

[56] References Cited

U.S. PATENT DOCUMENTS

| | | | |
|---|---|---|---|
| 3,949,277 | 4/1976 | Yosset | 361/601 |
| 5,033,112 | 7/1991 | Bowling et al. | |
| 5,070,429 | 12/1991 | Skirpan | 361/641 |
| 5,212,623 | 5/1993 | Wilson et al. | 361/622 |
| 5,355,627 | 10/1994 | Katz | 312/227 |
| 5,430,334 | 7/1995 | Pullizi et al. | 307/38 |

FOREIGN PATENT DOCUMENTS 62-048893  3/1987  Japan .

Primary Examiner—Albert W. Paladini
Attorney, Agent, or Firm—Pollock, Vande Sande & Amernick

[57] ABSTRACT

A power supply system which is designed to control the power supply to, for example, a building-block private branch exchange (PBX) system is provided which includes main and extension cabinets having disposed therein AC power supply units, respectively, and a power supply control circuit. The main and extension cabinets are supplied with AC power from an external power source and provide DC outputs. The power supply control circuit includes a first and a second switching circuit. The first switching circuit allows the supply of AC power to the AC power supply unit of the extension cabinet when the power supply system is turned on and interrupts it when the power supply system is turned off. The second switching circuit establishes communication between the AC power supply unit of the extension cabinet and a backup battery when the power supply system is turned on and blocks it when the power supply system is turned off.

2 Claims, 4 Drawing Sheets

STRUCTURE OF POWER SUPPLY SYSTEM

BACKGROUND OF THE INVENTION

1. Technical Field of the Invention

The present invention relates generally to a power supply system designed to control AC power supply units disposed in cabinets, and more particularly to an improved structure of a power supply system capable of controlling the power supply to, for example, a building-block private branch exchange (PBX) system in a simple switching operation of an AC power supply unit installed in a main cabinet.

2. Background of Related Art

Usually, turning on and off power sources of key telephone units in the building-block PBX system requires controlling AC power supply units together which are disposed within a plurality of cabinets. In a conventional power supply system for the key telephone units, turning on and off the power sources of the key telephone units is achieved by manually operating a circuit breaker installed in a main cabinet.

Each of the cabinets is commonly designed to activate a backup battery when the AC power output is interrupted by the circuit breaker in the main cabinet. Thus, when the power output from the AC power supply unit in each of the cabinets is stopped completely, communication between the backup battery and the AC power supply unit is blocked using a battery shut-off switch.

The above conventional power supply system, however, has the following drawback.

The circuit breaker and the battery shut-off switches are usually turned on and off in a manual operation while front panels of the cabinets are opened. Energized circuit components are, thus, exposed to the outside undesirably, which does not meet safety standards.

SUMMARY OF THE INVENTION

It is therefore a principal object of the present invention to avoid the disadvantages of the prior art.

It is another object of the present invention to provide a simple circuit structure of a power supply system capable of turning on and off AC power supply units in safety.

According to one aspect of the present invention, there is provided a power supply system which comprises: (a) a main cabinet having disposed therein an AC power supply unit; (b) an extension cabinet having disposed therein an AC power conversion unit; and (c) a control circuit controlling supply of AC power to the AC power conversion unit of the extension cabinet and communication between the AC power conversion unit of the extension cabinet and a power backup circuit. The control circuit includes a first switching circuit and a second switching circuit. The first switching circuit allows the conversion of AC power to the AC power supply unit of the extension cabinet when the power supply system is turned on and interrupts the conversion of AC power to the AC power supply unit of the extension cabinet when the power supply system is turned off. The second switching circuit establishes the communication between the AC power conversion unit of the extension cabinet and the power backup circuit when the power supply system is turned on and blocks the communication between the AC power conversion unit of the extension cabinet and the power backup circuit when the power supply system is turned off.

In the preferred mode of the invention, the first switching circuit includes a relay circuit which is in a deenergized state when the power supply system is turned on to allow the supply of AC power to the AC power conversion unit of the extension cabinet.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 2:
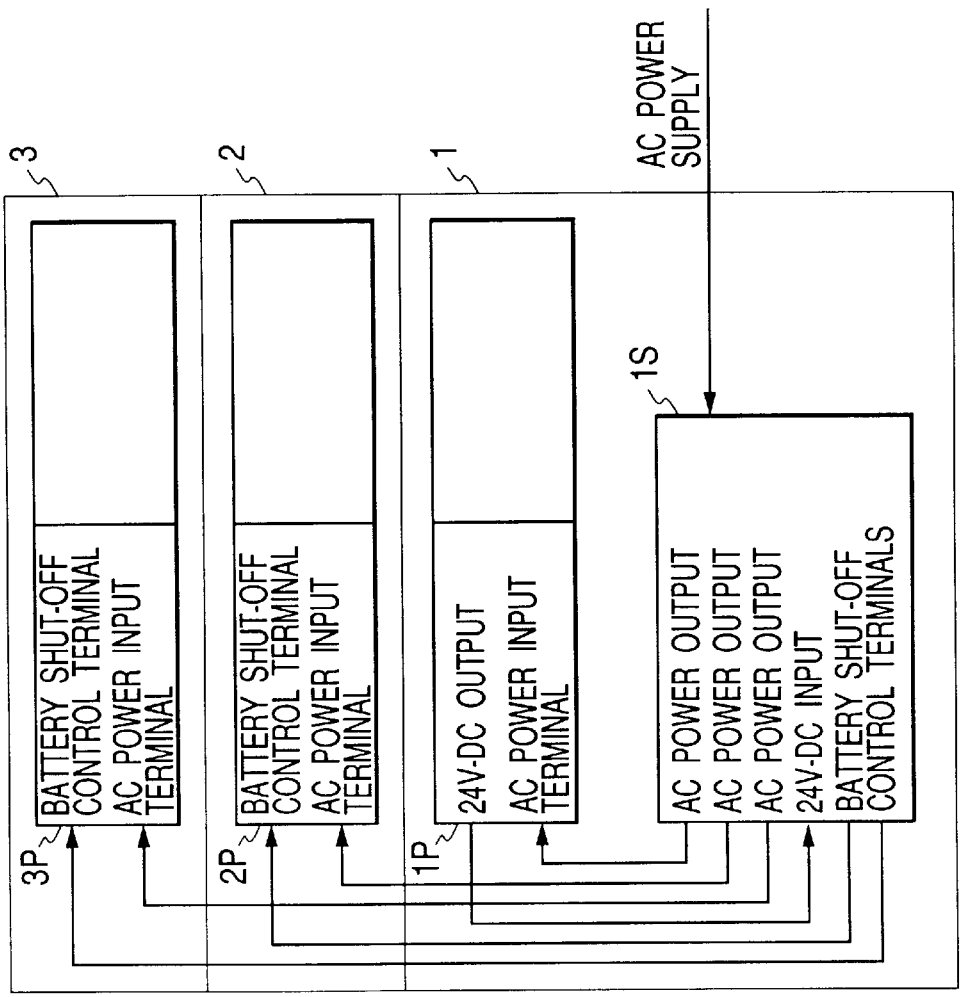
FIG. 2 is a block diagram which shows an internal structure of the power supply system of FIG. 1.
Figure 1:
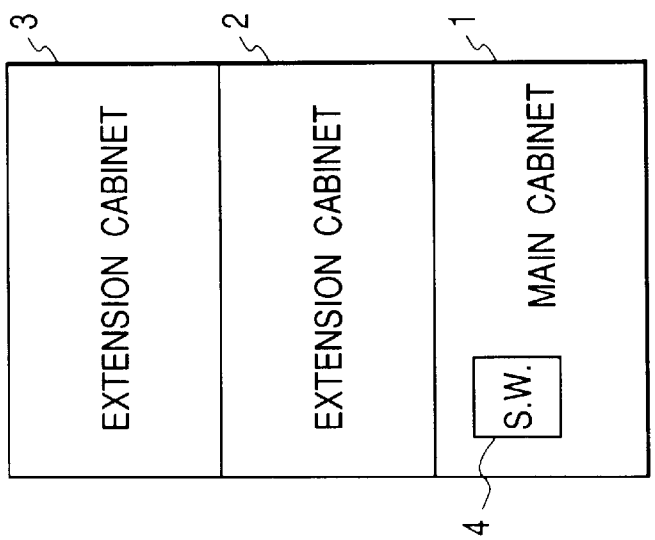
FIG. 1 is a block diagram which shows a power supply system according to the invention.

Referring now to the drawings, particularly to FIGS. 1 and 2, there is shown a power supply system for use in a building-block private branch exchange (PBX) system according to the present invention.

The power supply system includes generally a main cabinet 1 and extension cabinets 2 and 3. The main cabinets 1 has disposed on a front panel thereof a power supply switch unit 4. The cabinet 1, 2, and 3 include, as shown in FIG. 2, AC power conversion units 1P, 2P, and 3P, respectively. The main cabinet 1 has disposed therein a switch box 1S which controls the AC power conversion units 1P to 3P together.

The AC power conversion units 1P to 3P receive electric power from an external AC power source (not shown) through the switch box 1S. The AC power conversion unit 1P converts the AC input into 24 volts DC and supplies it to the switch box 1S. The switch box 1S outputs control signals to battery shut-off control terminals of the AC power conversion units 2P and 3P.

Figure 3:
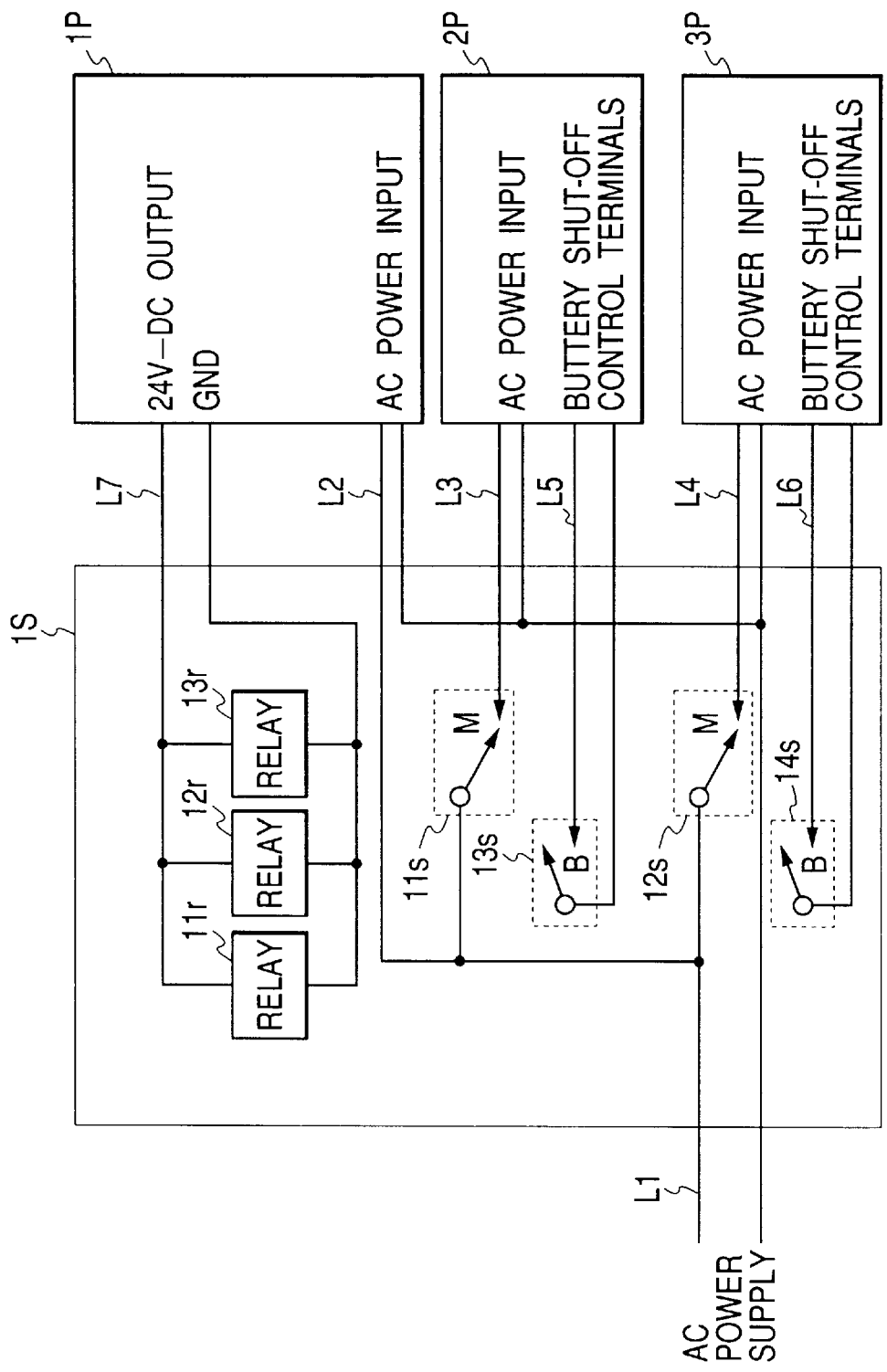
FIG. 3 is a block diagram which shows an internal structure of a switch box.

FIG. 3 shows a circuit structure of the switch box 1S when the power supply system is turned on.

The switch box 1S is, as described above, designed to supply the AC power inputted from the external AC power source to the AC power conversion units 1P to 3P. Specifically, the AC power supplied through a line L1 is inputted to the AC power conversion unit 1P of the main cabinet 1 through a line L2, to the AC power conversion unit 2P of the extension cabinet 2 through a relay contact 11s and a line L3, and to the AC power conversion unit 3P of the extension cabinet 3 through a relay contact 12s and a line 14.

The switch box 1S also includes relay contacts 13s and 14s. The relay contact 13s selectively establishes communication between battery shut-off control terminals of the AC power conversion unit 2P through a line L5. Similarly, the relay contact 14s selectively establishes communication between battery shut-off control terminals of the AC power conversion unit 3P.

The relay contacts 11s to 14s are opened or closed by activities of relays 11r, 12r, and 13r energized by the 24 volts DC power supplied from the AC power conversion unit 1P through a line L7.

Specifically, the relay contacts 11s and 12s are controlled by the relays 11r and 12r, respectively. The relay contacts 13s and 14s are both controlled by the relay 13r. The relay contacts 11s and 12s are normally opened M-contacts, while the relay contacts 13s and 14s are normally closed B-contacts. The relay 11r and relay contact 1 is (or the relay 12r and the relay contact 12s) make up a first switching circuit. The relay 13r and the relay contact 13s (or the relay contact 14s) make up a second switching circuit.

Figure 4:
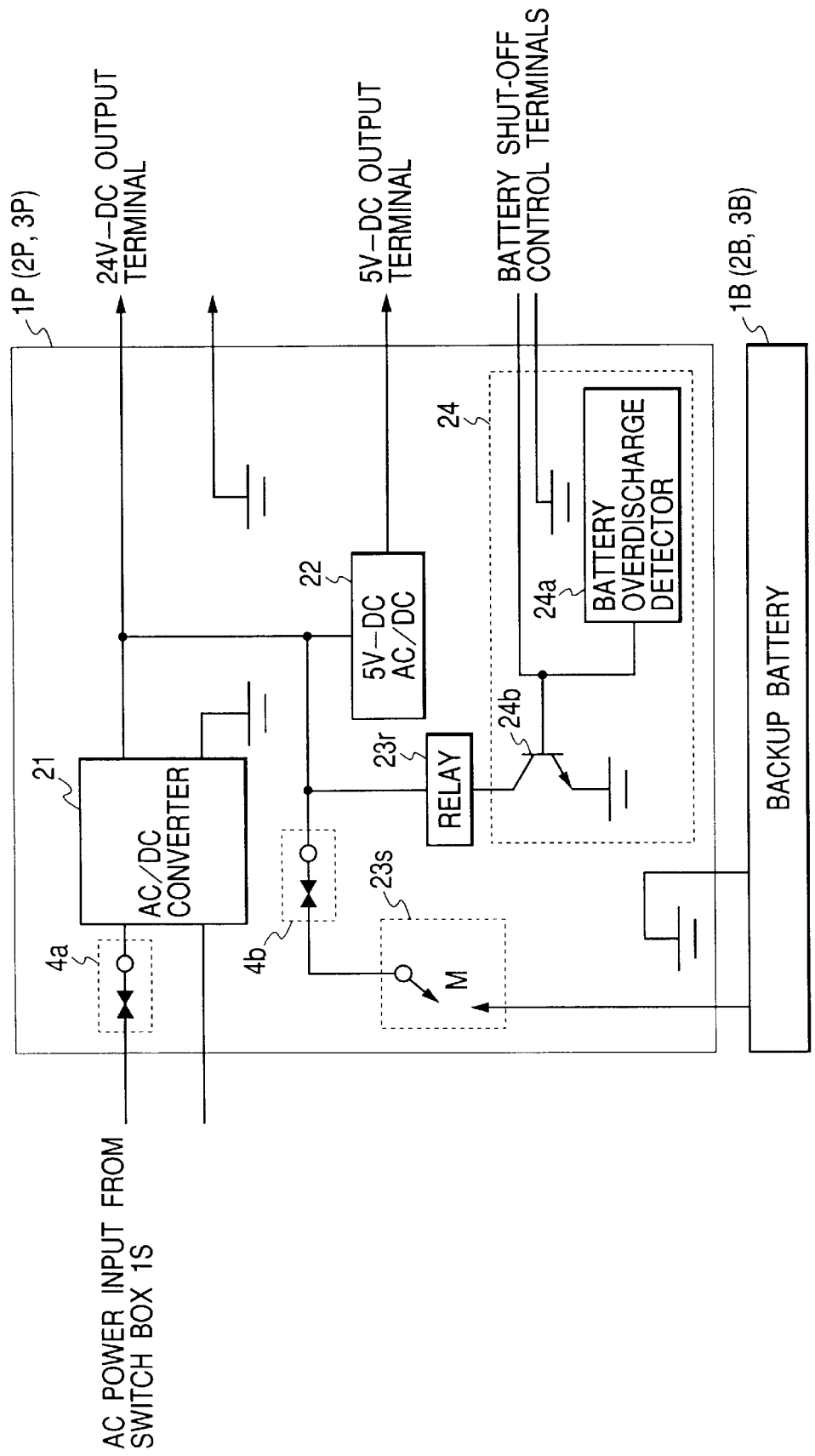
FIG. 4 is a block diagram which shows an internal structure of each of the AC power conversion units.

FIG. 4 shows a circuit structure of the AC power conversion unit 1P. The AC power conversion units 2P and 3P have the same structure, and explanation thereof in detail will be omitted here.

The AC power output from the switch box 1S is supplied to an AC/DC converter 21 through a switch 4a of the power supply switch unit 4. The AC/DC converter 21 converts the AC input into 24 volts DC and supplies it to a 24V-DC output terminal, a DC/DC converter 22, and a battery control circuit 24 through a shut-off relay 23r. The DC/DC converter 22 converts the DC input into a 5 volts DC.

The battery control circuit 24 includes a battery overdischarge detection circuit 24a and a transistor 24b. The battery overdischarge detection circuit 24a is designed to detect overdischarge of a backup battery 1B and provides an overdischarge signal. The transistor 24b is responsive to a control signal inputted through the battery shut-off terminal or the overdischarge signal from the battery overdischarge detection circuit 24a to selectively open and close a relay contact 23s through the shut-off relay 23r. Even if the AC power supply from the switch box 1S is interrupted unintentionally for some reason, the relay contact 23s is kept closed to connect the backup battery 1B with the 24-DC output terminal, the DC/DC converter 22, and the relay 23r through a switch 4b of the power supply switch unit 4.

In operation, activation of the power supply system is accomplished by turning on the power supply switch unit 4 of the main cabinet 1. When the power supply switch unit 4 is turned on, it will cause the 24 volts DC to be supplied from the AC power conversion unit 1P to the switch box 1S to energize the relays 11r to 13r.

When the relays 11r and 12r are energized, the relay contacts 11s and 12s are closed to supply the AC power to the AC power conversion units 2P and 3P of the extension cabinets 2 and 3. When the relay 13r is energized, the relay contacts 13s and 14s are opened to energize the transistors 24b and the relays 23r of the AC power conversion units 2P and 3P, thereby establishing communications between the backup batteries 2B and 3B and the AC power conversion units 2P and 3P, respectively. This allows the AC power supply units 2P and 3P to be supplied with power from the backup batteries 2B and 3B when the AC power supply from the switch box 1S is interrupted.

The deactivation of the power supply system is accomplished by turning off the power supply switch unit 4 of the AC power supply unit 1P of the main cabinet 1. When the power supply switch unit 4 is turned off, it will cause the supply of 24 volts DC to the switch box 1S to be interrupted, thereby turning off the relays 11r to 13r. This causes the relay contacts 11s and 12s to be opened to cut the supply of AC power to the AC power supply units 2P and 2P and the relay contacts 13s and 14s to be closed to deenergize the transistors 24b and the relay 23r of the AC power conversion units 2P and 3P to block the communications between the AC power conversion units 2P and 3P and the backup batteries 2B and 3B, respectively.

Figure 5:
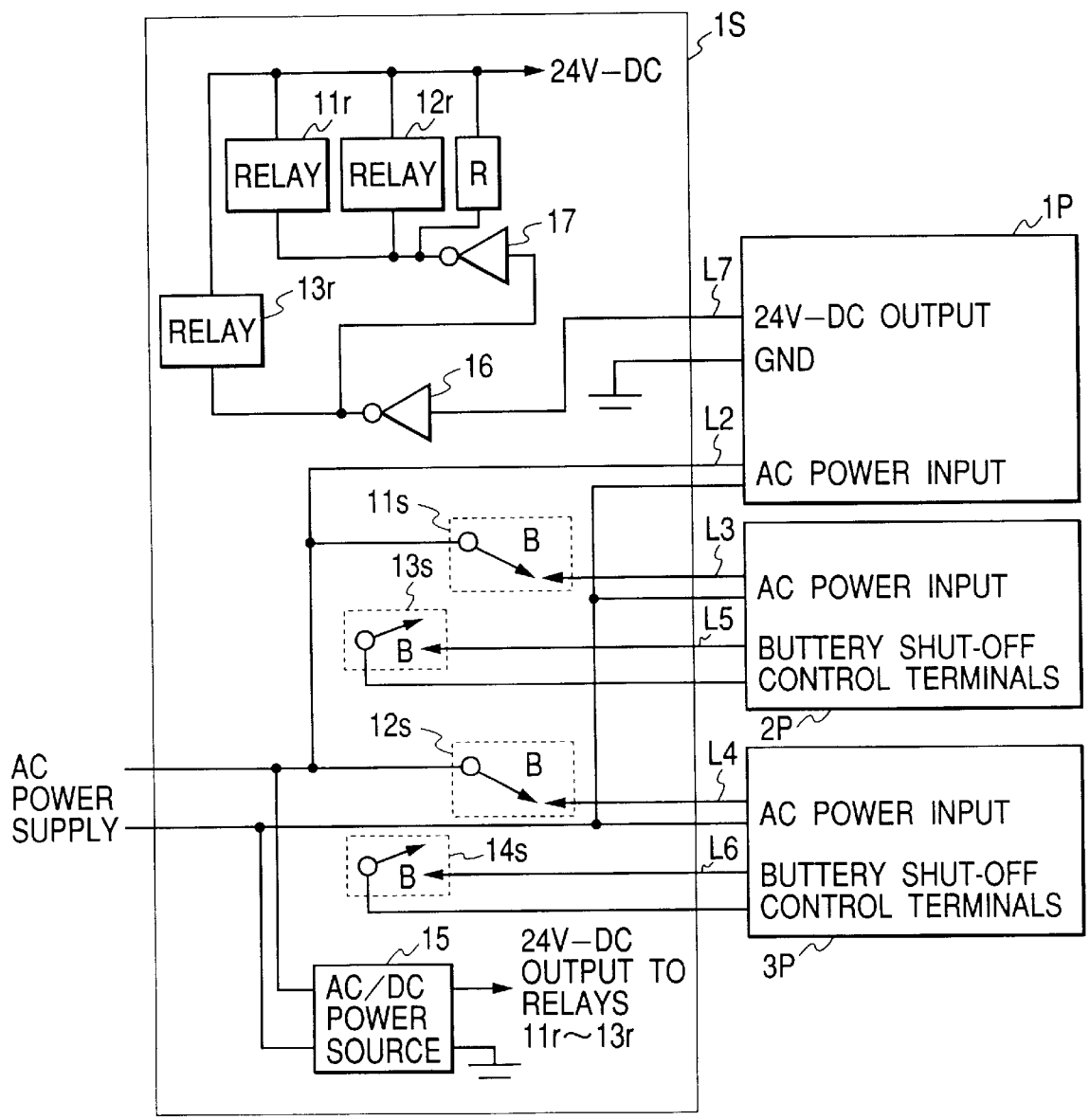
FIG. 5 is a block diagram which shows a modification of the switch box in FIG. 3.

FIG. 5 shows a modification of the switch box 1S. The same reference numbers as employed in FIG. 3 refer to the same parts.

The switch box 16 includes an AC/DC power source 15 which is designed to convert the AC input into 24 volts DC and outputs it to the relays 11r to 13r.

The AC power conversion unit 1P provides 24 volts DC to a GND terminal of the relay 13r through the line L7 and an inverter 16. An output of the inverter 16 is supplied to GND terminals of the relays 11r and 12r through an inverter 17. The relay contacts 11s and 12s are normally closed B-contacts. Other arrangements are identical with those shown in FIG. 3, and explanation thereof in detail will be omitted here.

In operation, activation of the power supply system is accomplished by turning on the power supply switch unit 4 of the main cabinet 1. When the power supply switch unit 4 is turned on, it will cause the 24 volts DC to be supplied from the AC power conversion unit 1P to the switch box 1S.

The AC/DC power source 15 receives the AC power and outputs the 24 volts DC to the relays 11r to 13r at all times. The input of the 24 volts DC from the AC power supply unit 1P to the inverter 16, thus, causes the relays 11r and 12r to be deenergized through the inverter 17 and the relay 13r to be energized so that the relay contacts 11s and 12s are closed, while the relay contacts 13s and 14s are opened. This causes the AC power to be supplied from the switch box 1S to the AC power conversion units 2P and 3P of the extension cabinets 2 and 3. The relays 23s of the AC power supply units 2P and 3P are then closed to establish communications between the backup batteries 2B and 3B and the AC power conversion units 2P and 3P, respectively.

The deactivation of the power supply system is accomplished by turning off the power supply switch unit 4 of the AC power supply unit 1P of the main cabinet 1. When the power supply switch unit 4 is turned off, it will cause the supply of 24 volts DC from the AC power conversion unit 1P to the switch box 1S to be interrupted, thereby energizing the relays 11r and 12r and deenergizing the relay 13r. This causes the relay contacts 11s and 12s to be opened to cut the conversion of AC power to the AC power supply units 2P and 2P and the relay contacts 13s and 14s to be closed.

Therefore, the conversion of AC power to the AC power supply units 2P and 3P is interrupted. This causes the relays 23s of the AC power supply units 2P and 3P are opened to block the communications between the backup batteries 2B and 3B and the AC power supply units 2P and 3P.

As apparent from the above discussion, the power supply system of this modification is designed to supply the AC power to the AC power supply units 2P and 3P of the extension cabinets 2 and 3 through the relays 11r and 12r that are deenergized. This increases the life of the relays 11r and 12r and improves the reliability of the power supply system.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A power supply system comprising:
   a main cabinet having disposed therein an AC power supply unit;

an extension cabinet having disposed therein an AC power conversion unit; and a control circuit controlling supply of AC power from said AC power supply unit to the AC power conversion unit of said extension cabinet and communication between the AC power conversion unit of said extension cabinet and a power backup circuit, said control circuit including a first switching circuit and a second switching circuit, the first switching circuit allowing the supply of AC power from said AC power supply to the AC power conversion unit of said extension cabinet when the power supply system is turned on and interrupting the supply of AC power from said AC power supply unit to the AC power conversion unit of said extension cabinet when the power supply system is turned off, the second switching circuit establishing the communication between the AC power conversion unit of said extension cabinet and the power backup circuit when the power supply system is turned on and blocking the communication between the AC power conversion unit of said extension cabinet and the power backup circuit when the power supply system is turned off.

2. A power supply system as set forth in claim 1, wherein the first switching circuit includes a relay circuit which is in a deenergized state when the power supply system is turned on to allow the supply of AC power from said AC power supply unit to the AC power conversion unit of said extension cabinet.

* * * * *